US008860969B2

(12) United States Patent
Nagasaki

(10) Patent No.: US 8,860,969 B2
(45) Date of Patent: Oct. 14, 2014

(54) INTERMEDIATION SERVER AND COMMUNICATION DEVICE

(71) Applicant: Brother Kogyo Kabushiki Kaisha, Nagoya (JP)

(72) Inventor: Takeshi Nagasaki, Nagoya (JP)

(73) Assignee: Brother Kogyo Kabushiki Kaisha, Nagoya-Shi, Aichi-Ken ( * ) Notice: Subject to any disclaimer, the term of this patent is extended or adjusted under 35 U.S.C. 154(b) by 204 days.

(21) Appl. No.: 13/627,199

(22) Filed: Sep. 26, 2012

(65) Prior Publication Data

US 2013/0135643 A1     May 30, 2013

(30) Foreign Application Priority Data

Nov. 24, 2011   (JP) .................... 2011-256556

(51) Int. Cl.
*G06F 3/12*      (2006.01)
(52) U.S. Cl.
USPC ........................... 358/1.13; 358/1.15; 358/1.1
(58) Field of Classification Search
None
See application file for complete search history.

(56) References Cited

U.S. PATENT DOCUMENTS

| 6,778,289 B1 | 8/2004 | Iwata | |
| 2002/0002603 A1* | 1/2002 | Vange | 709/219 |
| 2004/0212824 A1* | 10/2004 | Ohara | 358/1.15 |
| 2011/0231473 A1 | 9/2011 | Narayanan et al. | |
| 2012/0117199 A1* | 5/2012 | Nagasaki et al. | 709/219 |

FOREIGN PATENT DOCUMENTS

| JP | 2005-269250 A | 9/2005 |
| JP | 2007-058429 A | 3/2007 |
| JP | 2012-104978 A | 5/2012 |
| WO | 2005/083555 A1 | 9/2005 |

\* cited by examiner

*Primary Examiner* — Marcus T Riley
(74) *Attorney, Agent, or Firm* — Merchant & Gould PC

(57) ABSTRACT

An intermediation server may receive one notification from a communication device. The one notification may include a plurality of identification information for identifying a plurality of target data to be communicated between the communication device and a specific server. The intermediation server may prepare a plurality of demand-creation data corresponding to the plurality of target data, and supply the plurality of demand-creation data to the communication device. Each of the plurality of demand-creation data may be necessary for the communication device to create one communication demand, and include timing information related to a timing at which the demand-creation data has been prepared. The intermediation server may prepare first demand-creation data, and then prepare second demand-creation data under a condition that the communication device has created a first communication demand by using the first demand-creation data and has sent the first communication demand to the specific server.

11 Claims, 5 Drawing Sheets

(Comparative Example)

__US 8,860,969 B2__

INTERMEDIATION SERVER AND COMMUNICATION DEVICE

CROSS-REFERENCE TO RELATED APPLICATIONS

This application claims priority to Japanese Patent Application No. 2011-256556, filed on Nov. 24, 2011, the contents of which are hereby incorporated by reference into the present application.

TECHNICAL FIELD

The present specification discloses an intermediation server configured to intermediate a communication between a communication device and a specific server. The present specification further discloses a communication device configured to communicate with a specific server via an intermediation server.

DESCRIPTION OF RELATED ART

For example, an image processing device for scanning a document and creating image data is known. The image processing device can upload the image data to a server.

SUMMARY

The present specification presents a technique that a communication device and a specific server may appropriately communicate a plurality of target data.

One aspect disclosed in the present application may be an intermediation server configured to intermediate a communication between a communication device and a specific server. The intermediation, server may comprise: a processor; and a memory storing computer-readable instructions therein. The computer-readable instructions, when executed by the processor, may cause the intermediation server to perform: receiving one notification from the communication device, the one notification including a plurality of identification information for identifying a plurality of target data to be communicated between the communication device and the specific server; preparing a plurality of demand-creation data corresponding to the plurality of target data by using the plurality of identification information included in the one notification in a case where the one notification is received from the communication device, each of the plurality of demand-creation data being data which is necessary for the communication device to create one communication demand for communicating one target data corresponding to the demand-creation data, and each of the plurality of demand-creation data including timing information related to a timing at which the demand-creation data has been prepared; and supplying the plurality of demand-creation data to the communication device. The preparing the plurality of demand-creation data may include: preparing first demand-creation data corresponding to first target data among the plurality of target data; and preparing second demand-creation data corresponding to second target data among the plurality of target data after preparing the first demand-creation data, under a condition that the communication device has created a first communication demand by using the first demand-creation data and has sent the first communication demand to the specific server.

Another aspect disclosed in the present application may be a communication device configured to communicate with a specific server via an intermediation server. The communication device may comprise a processor; and a memory storing computer-readable instructions therein. The computer-readable instructions, when executed by the processor, may cause the communication device to perform: sending one notification to the intermediation server, the one notification including a plurality of identification information for identifying a plurality of target data to be communicated between the communication device and the specific server, the intermediation server being a server configured to prepare a plurality of demand-creation data corresponding to the plurality of target data by using the plurality of identification information included in the one notification in a case where the one notification is received from the communication device, each of the plurality of demand-creation data being data which is necessary for the communication device to create one communication demand for communicating one target data corresponding to the demand-creation data, and each of the plurality of demand-creation data including timing information related to a timing at which the demand-creation data has been prepared; obtaining the plurality of demand-creation data from the intermediation server; creating a plurality of communication demands by using the plurality of demand-creation data; and sending the plurality of communication demands to the specific server so as to communicate the plurality of target data with the specific server. The obtaining the plurality of demand-creation data may include: obtaining first demand-creation data corresponding to first target data among the plurality of target data; and obtaining second demand-creation data corresponding to second target data among the plurality of target data after obtaining the first demand-creation data, under a condition that the communication device has created a first communication demand by using the first demand-creation data and has sent the first communication demand to the specific server.

Moreover, a control method, a computer program (that is, computer-readable instructions), and a non-transitory computer-readable recording medium that stores the computer program, all for realizing the intermediation server, are also novel and useful. In addition, a control method, a computer program (that is, computer-readable instructions), and a non-transitory computer-readable recording medium that stores the computer program, all for realizing the communication device, are also novel and useful.

Figure 1:
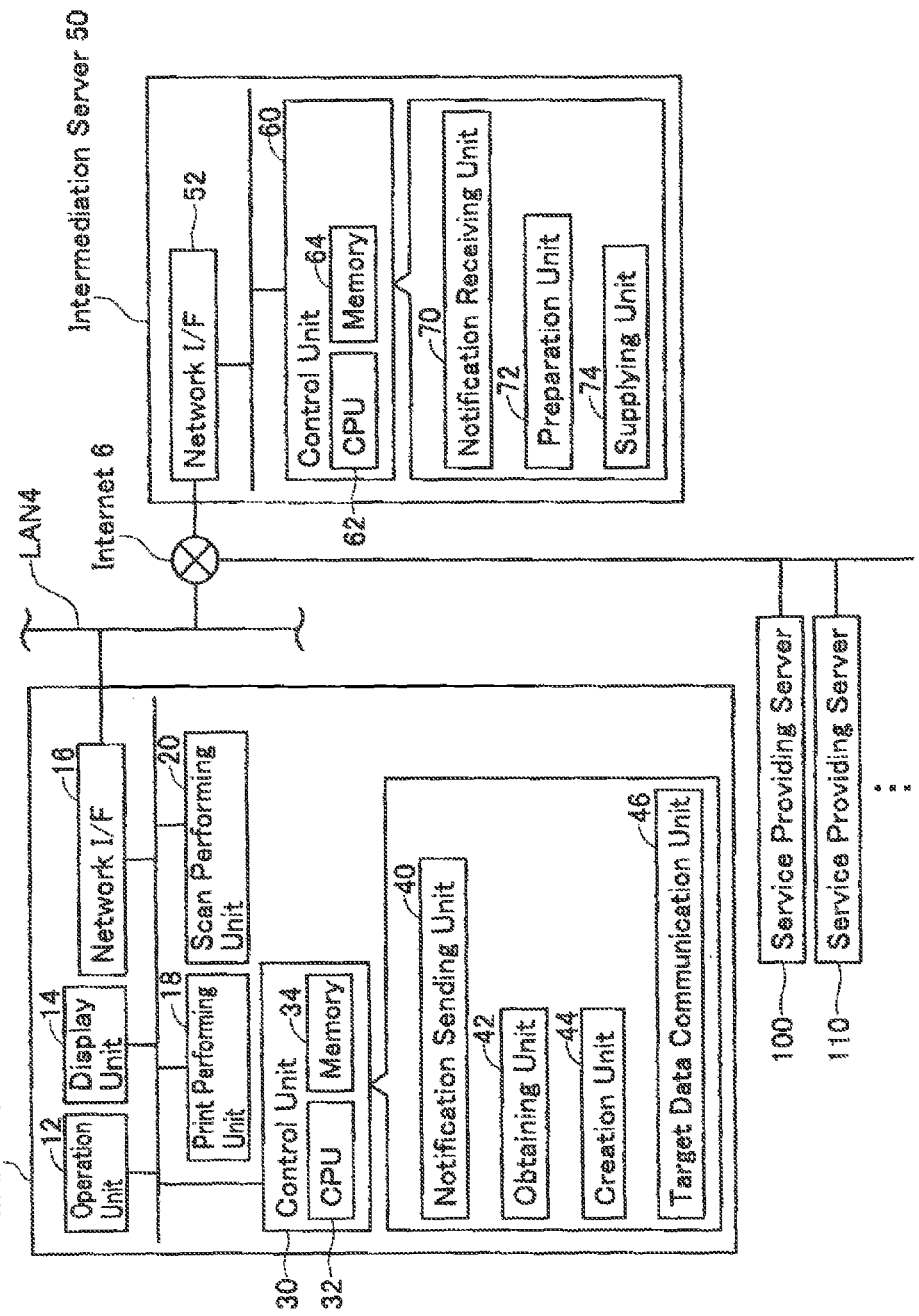
FIG. 1 shows a configuration of a communication system.

EMBODIMENT (First Embodiment)
(Configuration of System)
As shown in FIG. 1, a communication system 2 comprises a multi-function device 10, intermediation server 50 and a plurality of service providing servers 100, 110. The multi-function device 10 is connected with a LAN 4. The intermediation server 50 and the plurality of service providing servers 100, 110 are connected with an internet 6.

(Configuration of Multi-Function Device 10)

The multi-function device 10 is capable of executing multiple functions such as a print function, scan function, copy function, FAX function, etc. The multi-function device 10 is further capable of downloading image data that is stored in the service providing servers 100, 110 and executing a download print function (called "DL print function" below) for printing the image represented by the image data. Further, the multi-function device 10 is further capable of executing a scan upload function (called "scan UL function" below) for uploading, to the service providing servers 100, 110, the image data created by the multi-function device 10 performing a scan.

The multi-function device 10 comprises an operation unit 12, a display unit 14, a network interface 16, a print performing unit 18, a scan performing unit 20 and a control unit 30. The operation unit 12 comprises a plurality of keys. A user can input various commands to the multi-function device 10 by operating the operation unit 12. The display unit 14 is a display for displaying a variety of information. The network interface 16 is connected with the LAN 4. The print performing unit 18 is an inkjet type or laser type, etc. printing mechanism. The scan performing unit 20 is a CCD or CIS, etc. scanning mechanism.

The control unit 30 comprises a CPU 32 and a memory 34. The CPU 32 executes various processes according to programs stored in the memory 34. The functions of a notification sending unit 40, an obtaining unit 42, a creation unit 44 and a target data communication unit 46 are realized by the CPU 32 executing processes according to the aforementioned programs.

(Configuration of Intermediation Server 50)

The intermediation server 50 is a server for intermediating provision of service to the multi-function device 10 from the service providing servers 100, 110. The intermediation server 50 is a server provided by a vendor of the multi-function device 10. The intermediation server 50 comprises a network interface 52 and a control unit 60. The control unit 60 comprises a CPU 62 and a memory 64. The CPU 62 executes various processes according to programs stored in the memory 64. The functions of a notification receiving unit 70, a preparation unit 72 and a supplying unit 74 are realized by the CPU 62 executing processes according to the programs.

(Configuration of Service Providing Servers 100, 110)

Each of the service providing servers 100, 110 is a known cloud server for, e.g., "Evernote (Registered Trademark)", "Google (Registered Trademark) Does", "PICASA (Registered Trademark)", "FACEBOOK (Registered Trademark)", etc. Each of the service providing servers 100, 110 is capable of providing service to various communication devices including the multi-function device 10. For example, the service providing servers 100, 110 are capable of executing an image supply service by which image data is supplied to the multi-function device 10 for the multi-function device 10 to execute the DL print function. Further, for example, the service providing servers 100, 110 are capable of executing an image storage service in which image data obtained from the multi-function device 10 is stored for the multi-function device 10 to execute the scan UL function.

Moreover, the service providing server 100 is a server provided by a first service provider (i.e., a first company), and the service providing server 110 is a server provided by a second service provider (i.e., a second company) that is different from the first service provider. The first service provider exposes a first API (Application Program Interface) for receiving a service from the service providing server 100, and the second service provider exposes a second API for receiving a service from the service providing server 110. Since the first service provider and the second service provider are different, the first API and the second API are usually different. In order to receive services from, for example, both the service providing servers 100, 110, communication apparatuses must be compatible with both the first and the second API (i.e., require a program for utilizing the first API and a program for utilizing the second API).

For example, in order for the multi-function device 10 to receive services from each of the plurality of service providing servers 100, 110, the multi-function device 10 must be compatible with the plurality of APIs, and must store many programs. However, the memory capacity of the multi-function device 10 is smaller than that of a PC, etc. Consequently, in the present embodiment, the intermediation server 50 is provided so that the multi-function device 10 can receive services from each of the plurality of service providing servers 100, 110 without storing many programs in the multi-function device 10. That is, the intermediation server 50 is compatible with a plurality of APIs for the plurality of service providing servers 100, 110. In a situation where the multi-function device 10 is to receive a service from a specific service providing server (e.g., the service providing server 100) from among the plurality of service providing servers 100, 110, the intermediation server 50 executes various communications (to be described; e.g., requests 202, 210 etc., of FIG. 2) with the specific service providing server by using an API for the specific service providing server. Thereby, the multi-function device 10 can communicate image data with the specific service providing server despite not being compatible with the API for the specific service providing server. That is, the multi-function device 10 can receive a service from each of the plurality of service providing servers 100, 110, despite not storing many programs for using a plurality of APIs.

(Advance Preparation by User of Multi-Function Device 10)

In order for the multi-function device 10 to receive services from the service providing servers 100, 110, a user of the multi-function device 10 (called "specific user" below) must execute the following advance preparation. Using, for example, a PC, a PDA terminal (e.g., a smartphone), etc., the specific user creates an account with each of the service providing servers 100, 110. Thereby, each of the service providing servers 100, 110 gives an access token (generally called "authentication information") to the specific user. The specific user registers the access tokens given by the service providing servers 100, 110 in the multi-function device 10. Moreover, using the PC, PDA terminal, etc., the specific user can upload various files (e.g., image data) to the service providing servers 100, 110. Further, using the PC, PDA terminal, etc., the specific user can also download various files that the specific user had uploaded.

Figure 2:
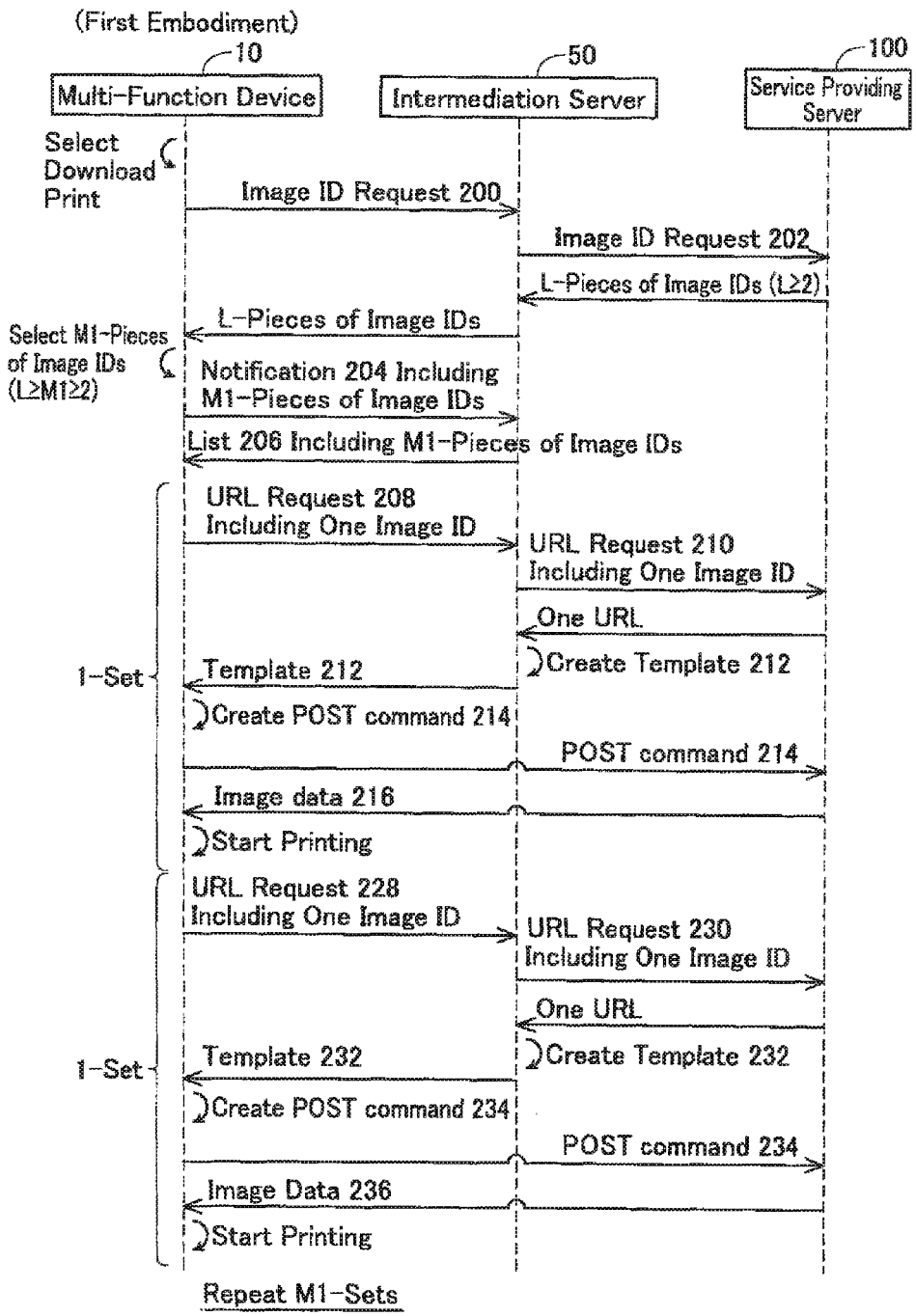
FIG. 2 shows a sequence diagram of processes executed by devices of a first embodiment when download print is executed.

(Process for Multi-Function Device 10 to Execute DL Print Function; FIG. 2)

Next, contents of processes executed by the devices 10, 50, 100 when the multi-function device 10 is to execute the DL print function will be described with reference to FIG. 2. Although not shown, the specific user operates the operation unit 12 of the multi-function device 10 so as to select the service providing server from which an image supply service is to be received. In the present embodiment, the description will proceed using a case, as an example, where the specific user has selected the service providing server 100.

By further operating the operation unit 12, the specific user selects the DL print function from among the plurality of functions that the multi-function device 10 is capable of executing. In this case, the control unit 30 of the multi-function device 10 sends an image ID request 200 to the intermediation server 50. Moreover, the multi-function device 10 sends the access token (called "specific access token" below), which the specific user received from the service providing server 100, to the intermediation server 50 at the stage of sending the image ID request 200 to the intermediation server 50, or at an earlier stage.

Upon receiving the image ID request 200 from the multi-function device 10, the control unit 60 of the intermediation server 50 sends an image ID request 202 to the service providing server 100. Moreover, using the specific access token, the control unit 60 of the intermediation server 50 causes the service providing server 100 to execute authentication at the stage of sending the image ID request 202 to the service providing server 100, or at an earlier stage. Thereby, the service providing server 100 can send an appropriate response to the intermediation server 50 in response to the image ID request 202 received from the intermediation server 50. Moreover, below, a description of the authentication using the specific access token is omitted. However, as required (e.g., each time a request is sent to the service providing server 100), the intermediation server 50 causes the service providing server 100 to execute authentication using the specific access token.

In the present embodiment, a situation is assumed in which the service providing server 100 is storing L-pieces of image data (L being an integer equal to 2 or more) in association with the account of the specific user. Moreover, in this situation, for each of the L-pieces of image data, the service providing server 100 is also storing thumbnail image data which has a smaller data size than the image data. Upon receiving the image ID request 202 from the intermediation server 50, the service providing server 100 sends L-pieces of image IDs (e.g., file names of the L-pieces of image data) for identifying the L-pieces of image data to the intermediation server 50.

Upon receiving the L-pieces of image IDs from the service providing server 100, the control unit 60 of the intermediation server 50 sends the L-pieces of image IDs to the multi-function device 10.

Moreover, although not shown, upon receiving the L-pieces of image IDs from the intermediation server 50, the control unit 30 of the multi-function device 10 obtains L-pieces of thumbnail image data corresponding to the L-pieces of image data from the service providing server 100, and causes L-pieces of thumbnail images represented by the L-pieces of thumbnail image data to be displayed in the display unit 14. Thereby, the specific user can operate the operation unit 12 to select a thumbnail image which, from among the L-pieces of thumbnail images, corresponds to the image of the download target.

In the present embodiment, a situation is assumed in which M1-pieces of thumbnail images (i.e., a plurality of thumbnail images; M1 being an integer equal to or less than L and equal to 2 or more) are selected from among the L-pieces of thumbnail images. For example, the specific user operates an OK button after specifying the M1-pieces of thumbnail images. Thereby, the control unit 30 of the multi-function device 10 selects the M1-pieces of thumbnail images according to an instruction of the specific user. The present embodiment does not assume a situation in which a plurality of thumbnail images is selected non-simultaneously, such as in a case where after one thumbnail image has been selected and printed, another thumbnail image is selected and printed. Instead, a situation is assumed in which a plurality (i.e., M1-pieces) of thumbnail images is selected simultaneously. Moreover, selecting the M1-pieces of thumbnail images simultaneously is identical to selecting M1-pieces of image IDs simultaneously.

Moreover, in the present embodiment, the L-pieces of thumbnail images are displayed in the multi-function device 10. However, in a variant, the L-pieces of image IDs (e.g., the file names of the L-pieces of image data) may be displayed without the multi-function device 10 displaying the L-pieces of thumbnail images. From among the L-pieces of image IDs, the specific use may select M1-pieces of image IDs corresponding to M1-pieces of images of the download target.

When the M1-pieces of image IDs are simultaneously selected, the notification sending unit 40 (see FIG. 1) of the multi-function device 10 creates a notification 204 that includes the M1-pieces of image IDs. Moreover, one communication data that is commonly known usually includes one header section and one body section. The notification 204 is not described with the M1-pieces of image IDs distributed in a plurality of body sections included in a plurality of communication data, but is described with all the M1-pieces of image IDs in one body section included in one communication data. That is, the notification 204 can be called one notification (one communication data). The notification sending unit 40 sends the notification 204 to the intermediation server 50.

The notification receiving unit 70 (see FIG. 1) of the intermediation server 50 receives the notification 204 from the multi-function device 10. In this case, the preparation unit 72 (see FIG. 1) of the intermediation server 50 creates a list 206 in which the M1-pieces of image IDs included in the notification 204 are described, and sends the list 206 to the multi-function device 10.

The obtaining unit 42 (see FIG. 1) of the multi-function device 10 receives the list 206 from the intermediation server 50. In this case, the obtaining unit 42 selects one image ID (called "first image ID" below) from among the M1-pieces of image IDs included in the list 206. Next, the obtaining unit 42 creates a URL request 208 that includes the first image ID, and sends the URL request 208 to the intermediation server 50. That is, the URL request 208 includes only one image ID (the first image ID) from among the M1-pieces of image IDs.

The preparation unit 72 of the intermediation server 50 receives the URL request 208 from the multi-function device 10. In this case, following the first API for the service providing server 100, the preparation unit 72 creates a URL request 210 in which the first image ID included in the URL request 208 is described, and sends the URL request 210 to the service providing server 100.

Moreover, as described above, in the example of FIG. 2, the communication of the URL request 210 is executed via the communications of the notification 204, the list 206 and the URL request 208. These communications are executed according to RESTful (Representational State Transfer ful). However, in a variant, the communications of the list 206 and the URL request 208 need not be executed after the notification 204 has been sent from the multi-function device 10 to the intermediation server 50. In this case, the preparation unit 72 of the intermediation server 50 may select the first image ID from among the M1-pieces of image IDs included in the notification 204, then may create the URL request 210 in which the first image ED is described, and send the URL request 210 to the service providing server 100.

Upon receiving the URL request 210, the service providing server 100 identifies one URL (i.e., a URL of a download source; called "first URL" below) that indicates a location within the server 100 of one image data 216 corresponding to the first image ID included in the URL request 210. Next, the service providing server 100 sends the first URL to the intermediation server 50.

The preparation unit 72 of the intermediation server 50 obtains the first URL by receiving the first URL from the service providing server 100. In this case, in accordance with the first API, the preparation unit 72 prepares (i.e., creates) a template 212 that includes the first URL. The template 212 includes data necessary for the multi-function device 10 to create an HTTP (Hyper Text Transfer Protocol) POST command. In the present embodiment, the service providing server 100 is using the POST command as a command for triggering provision of a service (image supply service and image storage service). Consequently, the preparation unit 72 prepares the template 212 which has a POST command format. Moreover, a time stamp is described in the POST command of the present embodiment. Consequently, the preparation unit 72 prepares the template 212 that includes not only the first URL, but also a time stamp indicating the current date and time (i.e., the date and time at which the template 212 was prepared). The preparation unit 72 sends the template 212 to the multi-function device 10, thereby supplying the template 212 to the multi-function device 10.

As described above, the service providing server 100 is using the POST command. However, the command that is used depends on the service providing server. For example, the service providing server 110 is using a GET command as a command for triggering the provision of a service. If the specific user were to desire receiving a service from the service providing server 110, the preparation unit 72 would prepare a GET command template according to the second API for the service providing server 110. A time stamp is not described in the GET command of the present embodiment. Consequently, when preparing the GET command template, the preparation unit 72 prepares a template that does not include a time stamp. Thus, the preparation unit 72 can create an appropriate template in accordance with the service providing server that is to execute communication with the multi-function device 10.

The obtaining unit 42 of the multi-function device 10 obtains the template 212 from the intermediation server 50 by receiving the template 212 from the intermediation server 50. In this case, the creation unit 44 (see FIG. 1) of the multi-function device 10 creates a POST command 214 by using the template 212. Specifically, the creation unit 44 creates the POST command 214 by describing the IP address of the multi-function device 10 as the source address together with using the information (the first URL, time stamp, etc.) described in the template 212 without making any change thereto. Next, the target data communication unit 46 (see FIG. 1) of the multi-function device 10 sends the POST command 214 to the service providing server 100 without going through the intermediation server 50.

Upon receiving the POST command 214, the service providing server 100 first determines whether the difference between the current date and time and the date and time indicated in the time stamp included in the POST command 214 is greater than a predetermined period. In a case where the difference is greater than the predetermined period, the service providing server 100 sends information indicating an error to the multi-function device 10. In this case, the multi-function device 10 cannot obtain the image data. On the other hand, in a case where the difference is smaller than the predetermined period, the service providing server 100 sends the image data 216 that is stored in the first URL included in the POST command 214 (i.e., the URL of the download source) to the multi-function device 10 without intermediating through the intermediation server 50. In the present embodiment, the image data 216 is communicated without intermediating through the intermediation server 50, and therefore private images of the specific user can be prevented from being transmitted through the intermediation server 50.

The target data communication unit 46 of the multi-function device 10 receives the image data 216 from the service providing server 100. When all the image data 216 has been received from the service providing server 100 (i.e., when the communication of the image data 216 ends), the control unit 30 of the multi-function device 10 causes the image represented by the image data 216 to be printed by the print performing unit 18. Thereby, the multi-function device 10 can receive the image supply service from the service providing server 100, and can execute the DL print function.

After printing of the image represented by the image data 216 has started (moreover, this may be before or after the printing has ended), the obtaining unit 42 of the multi-function device 10 selects one image ID (called "second image ID" below), this being different from the first image ID, from among the M1-pieces of image IDs included in the list 206. Next, the obtaining unit 42 creates a URL request 228 that includes the second image ID, and sends the URL request 228 to the intermediation server 50. That is, the URL request 228 includes only one image ID (i.e., the second image ID) from among the M1-pieces of image IDs.

The processes of the devices 10, 50, 100 after the URL request 228 has been sent are the same as described above. That is, the preparation unit 72 of the intermediation server 50 creates a URL request 230 in which the second image ID is described, and sends the URL request 230 to the service providing server 100, thereby receiving a URL of image data 236 corresponding to the second image ID (called "second URL" below) from the service providing server 100.

Next, the preparation unit 72 of the intermediation server 50 prepares (i.e., creates), according to the first API, a template 232 that includes the second URL. Moreover, as is clear from the above description, the preparation unit 72 prepares the template 232 after the multi-function device 10 has sent the POST command 214 to the service providing server 100. More specifically, the preparation unit 72 prepares the template 232 after the communication of the image data 216 between the multi-function device 10 and the service providing server 100 has been completed. Consequently, the date and time indicated by the time stamp included in the template 232 is later than the date and tune indicated by the time stamp included in the template 212. Next, the preparation unit 72 supplies the template 232 to the multi-function device 10.

Next, the obtaining unit 42 of the multi-function device 10 obtains the template 232 from the intermediation server 50, and the creation unit 44 creates a POST command 234 by using the template 232. Next, the target data communication unit 46 sends the POST command 234 to the service providing server 100, thereby receiving the image data 236 from the service providing server 100. Consequently, the control unit 30 causes the image represented by the image data 236 to be printed by the print performing unit 18.

The processes executed by the devices 10, 50, 100 from the communication of a URL request (e.g., the URL requests 208, 228) from the multi-function device 10 to the intermediation server 50 until the printing of an image represented by image data (the image data 216, 236 in the above example) are called "one set, of processes". As described above, in the present embodiment, the M1-pieces of image IDs are selected simultaneously by the specific user. The multi-function device 10 repeatedly sends a URL request that includes only one image ID (e.g., the URL requests 208, 228) to the intermediation server 50, downloading the image data one by one. Consequently, in the example of FIG. 2, M1-sets of processes are executed in total.

Figure 3:
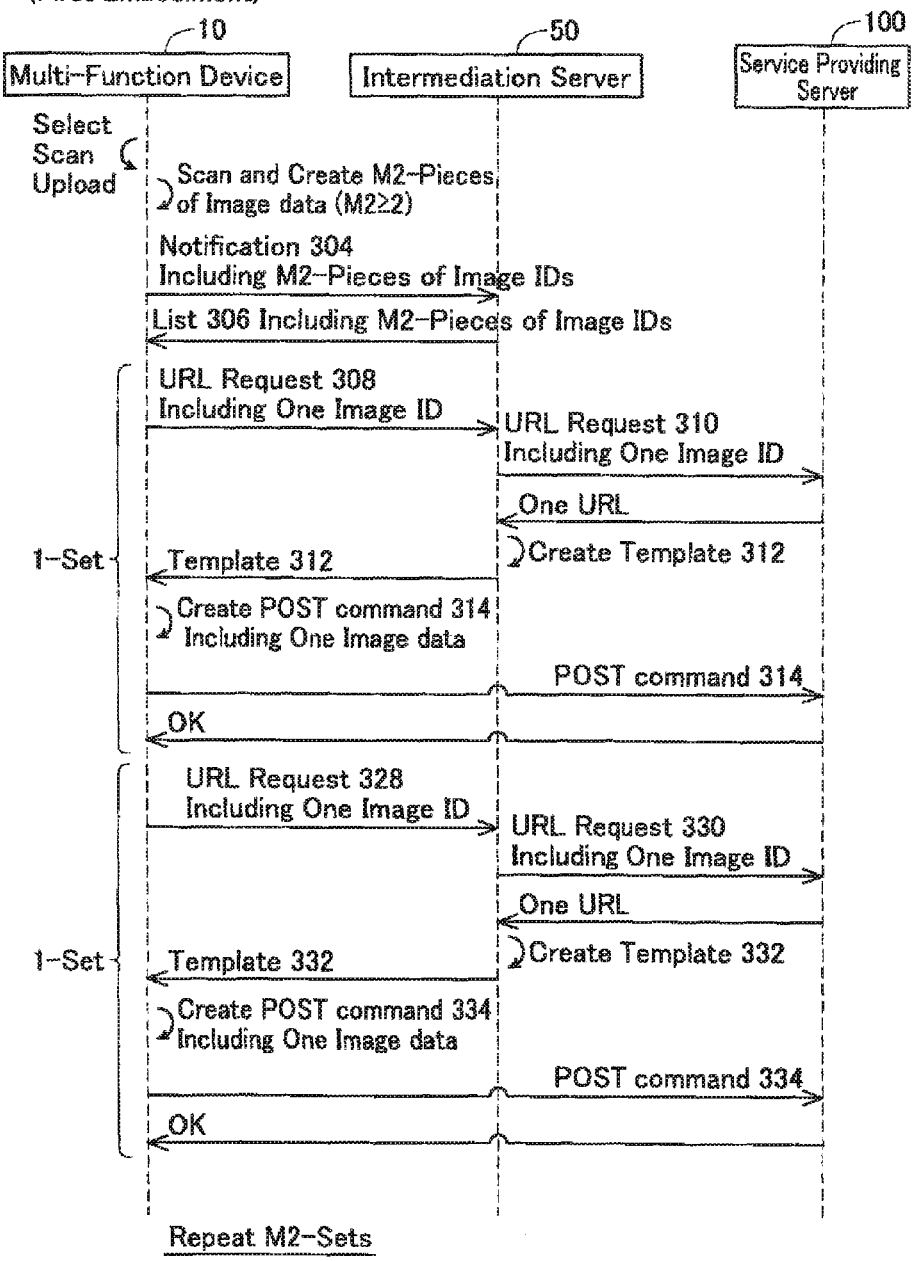
FIG. 3 shows a sequence diagram of processes executed by the devices of the first embodiment when scan upload is executed.

(Process for Multi-Function Device 10 to Execute Scan UL Function; FIG. 3)

Next, contents of processes executed by the devices 10, 50, 100 when the multi-function device 10 is to execute the scan UL function will be described with reference to FIG. 3. Although not shown, the specific user operates the operation unit 12 of the multi-function device 10, selecting the service providing server from which the image storage service is to be received. In the present embodiment, the description will proceed using the case, as an example, where the specific user has selected the service providing server 100.

By further operating the operation unit 12, the specific user selects the scan UL function from among the plurality of functions the multi-function device 10 is capable of executing. In this case, the control unit 30 of the multi-function device 10 causes the scan performing unit 20 to scan a document. In the present embodiment, a situation is assumed in which M2-sheets (M2 being an integer equal to 2 or more) of a document are scanned, and M2-pieces of image data are created. That is, the present embodiment does not assume a situation in which a plurality of image data is created non-simultaneously by scanning one sheet of a document to create one image data and then, after the one image data has been uploaded to the service providing server 100, another one sheet of the document is scanned, creating another one image data. Instead, a situation is assumed in which the M2-pieces of image data are created simultaneously.

When the M2-pieces of image data have been created, the notification sending unit 40 of the multi-function device 10 creates one notification 304 that includes M2-pieces of image IDs (e.g., file names of the M2-pieces of image data) corresponding to the M2-pieces of image data, and sends the notification 304 to the intermediation server 50.

The notification receiving unit 70 of the intermediation server 50 receives the notification 304 from the multi-function device 10. The subsequent processes are substantially the same as the processes of FIG. 2. That is, the preparation unit 72 of the intermediation server 50 creates a list 306 in which the M2-pieces of image IDs included in the notification 304 are described, and sends the list 306 to the multi-function device 10.

Next, the obtaining unit 42 of the multi-function device 10 selects one image ID (called "third image ID" below) from among the M2-pieces of image IDs included in the list 306. Next, the obtaining unit 42 creates a URL request 308 that includes the third image ID, and sends the URL request 308 to the intermediation server 50.

Next, the preparation unit 72 of the intermediation server 50 creates, according to the first API, a URL request 310 in which the third image ID is described, and sends the URL request 310 to the service providing server 100. In this case, the service providing server 100 sends, to the intermediation server 50, a URL that indicates a location within the server 100 where one image data corresponding to the third image ID included in the URL request 310 is to be stored (i.e., a URL of an upload destination; called "third URL" below).

Next, following the first API, the preparation unit 72 of the intermediation server 50 prepares (i.e., creates) a POST command template 312 that includes the third URL and a time stamp. The supplying unit 74 supplies the template 312 to the multi-function device 10.

The obtaining unit 42 of the multi-function device 10 obtains the template 312 from the intermediation server 50, and the creation unit 44 creates a POST command 314 by using the template 312. Moreover, the creation unit 44 creates the POST command 314 by describing, in the POST command 314, one image data (i.e., image data created by scanning) corresponding to the third image ID. Next, the target data communication unit 46 sends the POST command 314 to the service providing server 100 without intermediating through the intermediation server 50, thereby sending the image data to the service providing server 100. In the present embodiment, the POST command 314 is communicated without intermediating through the intermediation server 50, and therefore private images of the specific user can be prevented from being transmitted through the intermediation server 50.

In this case, the service providing server 100 stores the image data at the location indicated by the third URL (i.e., the URL of the upload destination). Thereby, the multi-function device 10 can receive the image storage service from the service providing server 100, and can execute the scan UL function. Moreover, in case the image data could be stored appropriately, the service providing server 100 sends information indicating OK to the multi-function device 10.

After the information indicating OK has been received from the service providing server 100 (i.e., after the communication of the image data has been completed), the obtaining unit 42 of the multi-function device 10 selects one image ID (called "fourth image ID" below), this being different from the third image ID, from among the M2-pieces of image IDs included in the list 306. Next, the obtaining unit 42 creates a URL request 328 that includes the fourth image ID, and sends the URL request 328 to the intermediation server 50.

The processes of the devices 10, 50, 100 after the URL request 328 has been sent are the same as described above. That is, the preparation unit 72 of the intermediation server 50 creates a URL request 330 in which the fourth image ID is described, and sends the URL request 330 to the service providing server 100, thereby receiving a URL of image data corresponding to the fourth image ID (called "fourth URL" below) from the service providing server 100.

Next, the preparation unit 72 of the intermediation server 50 prepares (i.e., creates), following the first API, a template 332 that includes the fourth URL and a time stamp. Moreover, as is clear from the above description, the preparation unit 72 prepares the template 332 after the multi-function device 10 has sent the POST command 314 to the service providing server 100. More specifically, the preparation unit 72 prepares the template 332 after the communication of one image data corresponding to the third image ID (communication of the POST command 314) between the multi-function device 10 and the service providing server 100 has been completed. The supplying unit 74 supplies the template 332 to the multi-function device 10.

Next, the obtaining unit 42 of the multi-function device 10 obtains the template 332 from the intermediation server 50, and the creation unit 44 creates a POST command 334 that includes one image data corresponding to the fourth image ID by using the template 332. Next, the target data communication unit 46 sends the POST command 334 to the service providing server 100, thereby sending the image data to the service providing server 100. Consequently, the service providing server 100 stores the image data at the location indicated by the fourth URL, and sends information indicating OK to the multi-function device 10.

The processes executed by the devices 10, 50, 100 from the communication of a URL request (e.g., the URL requests 308, 328) from the multi-function device 10 to the intermediation server 50 until the communication of the information indicating OK from the service providing server 100 to the multi-function device 10 are called "one set of processes". As described above, in the present embodiment, the M2-pieces of image data are created simultaneously. The multi-function device 10 repeatedly sends a URL request that includes only one image ID (e.g., the URL requests 308, 328) to the intermediation server 50, uploading the image data one by one. Consequently, in the example of FIG. 3, M-2 sets of processes are executed in total.

(Effects of the Present Embodiment)

Figure 4:
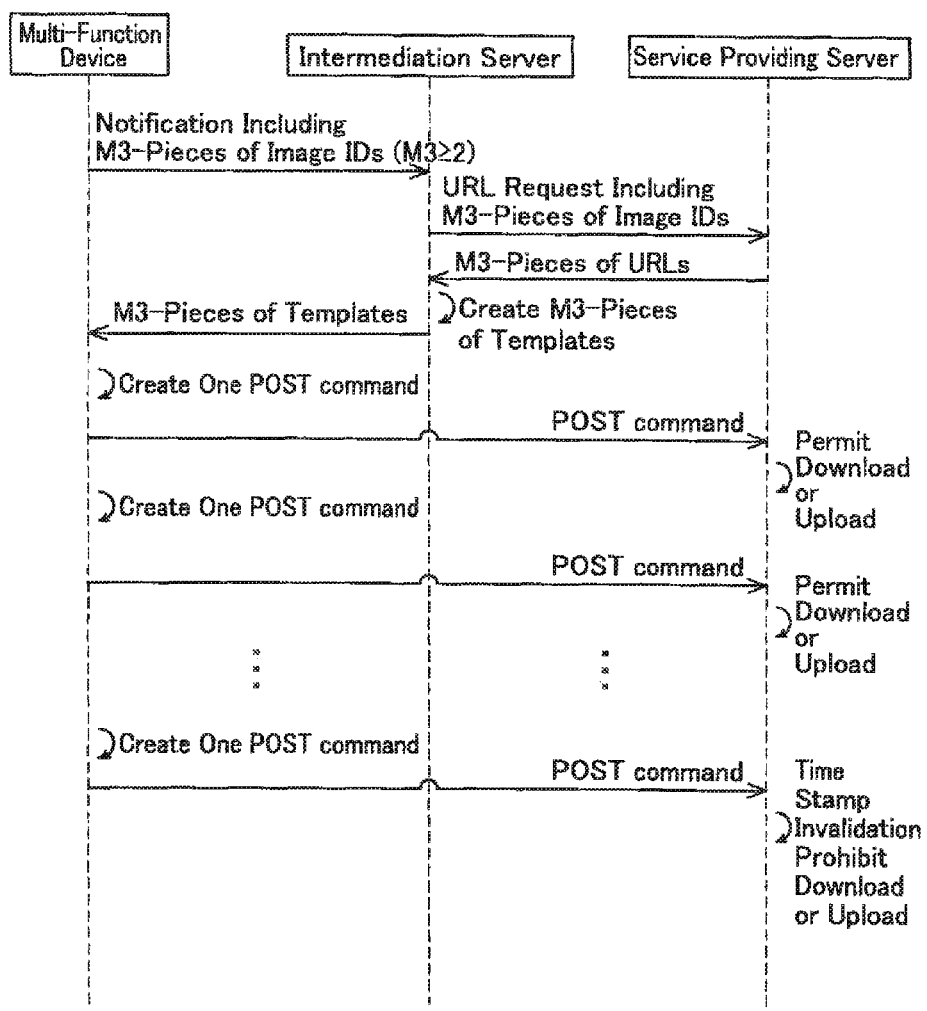
FIG. 4 shows a sequence diagram of processes executed by devices of a comparative example when download print or scan upload is executed.

In a comparative example of FIG. 4, upon receiving one notification that includes M3-pieces of image IDs (M3 being an integer equal to 2 or more) from the multi-function device, the intermediation server sends a URL request that includes the M3-pieces of image IDs to the service providing server, thereby receiving M3-pieces of URLs (each of which may be a URL of a download source or a URL of an upload destination) from the service providing server.

Next, the intermediation server prepares M3-pieces of templates by using the M3-pieces of URLs, and supplies the M3-pieces of templates to the multi-function device. In this case, the multi-function device sequentially uses the M3-pieces of templates to sequentially create M3-pieces of POST commands, and sequentially sends the M3-pieces of POST commands to the service providing server. However, in the comparative example, the M3-pieces of templates are prepared substantially simultaneously, and consequently a time stamp included in each template shows substantially the same date and time. Within these M3-pieces of templates, templates which are used comparatively later in the multi-function device 10 can have a large time difference between the timing at which the template was prepared and the timing at which a POST command created using that template is sent. Consequently, when receiving the POST command which, among the M3-pieces of POST commands, is sent comparatively late, the service providing server may determine that the difference between the current date and time and the date and time shown in the time stamp included in the POST command may be greater than the predetermined period. In this case, the service providing server determines that the time stamp is invalid, and sends information indicating an error to the multi-function device 10. That is, the multi-function device cannot download or upload the image data. In particular, the greater the value of M3, the more readily this event occurs.

By contrast, in the present embodiment, as shown in FIG. 2 and FIG. 3, the intermediation server 50 prepares the template 232 (or 332) after the multi-function device 10 has created the POST command 214 (or 314) by using the template 212 (or 312) and has sent the POST command 214 (or 314) to the service providing server 100. Consequently, it is possible to prevent a large time difference being present between the timing at which the template 232 (or 332) is prepared and the timing of sending the POST command 234 (or 334) which was created by using the template 232 (or 332). Consequently, it is possible to prevent the service providing server 100 from determining that the time stamp is invalid. That is, the intermediation server 50 can prepare the template 232 (or 332) at the appropriate timing, and consequently the template 232 (or 332) includes the appropriate time stamp which the service providing server 100 will not readily determine to be invalid. Consequently, the multi-function device 10 and the service providing server 100 can appropriately execute the communication (downloading or uploading) of a plurality of image data.

(Corresponding Relationships)

The multi-function device 10 and the service providing server 100 are respectively examples of the "communication device" and the "specific server". The M1-pieces of image IDs (or the M2-pieces of image IDs) are examples of the "plurality of identification information". The M1-pieces of image data (or the M2-pieces of image data) are examples of the "plurality of target data". The templates 212, 232 (or the templates 312, 332) are examples of the "plurality of demand-creation data". Further, the POST commands 214, 234 (or the POST commands 314, 334) are examples of the "communication demand".

For example, the first image ID, the URL request 208, the first URL, the image data 216, the template 212 and the POST command 214 are respectively examples of the "first identification information", "first request", "first location information", "first target data", "first demand-creation data" and "first communication demand". Further, the second image ID, the URL request 228, the second URL, the image data 236 and the template 232 are respectively examples of the "second identification information", "second request", "second location information", "second target data", "second demand-creation data" and "second communication demand".

(Second Embodiment)

Processes for the multi-function device 10 of a second embodiment to execute the DL print function will be described with reference to FIG. 5. The communication of a notification 404 and a list 406 is the same as the communication of the notification 204 and the list 206 of FIG. 2. The obtaining unit 42 of the multi-function device 10 selects N-pieces of image IDs (N being an integer equal to or more than 2 and less than M1), these being a part of the M1-pieces of image IDs included in the list 406, and sends a URL request 408 that includes the N-pieces of image IDs to the intermediation server 50.

Next, the preparation unit 72 of the intermediation server 50 creates a URL request 410 in which the N-pieces of image IDs are described, and sends the URL request 410 to the service providing server 100, thereby receiving, from the service providing server 100, URLs of N-pieces of image data 416-1, 416-2 corresponding to the N-pieces of image IDs. Next, following the first API, the preparation unit 72 prepares (i.e., creates) N-pieces of templates 412 using the N-pieces of URLs. Moreover, the date and time shown by the time stamps included in the N-pieces of templates 412 are substantially identical. The preparation unit 72 supplies the N-pieces of templates 412 to the multi-function device 10.

The obtaining unit 42 of the multi-function device 10 obtains the N-pieces of templates 412 from the intermediation server 50, and the creation unit 44 creates a POST command 414-1 by using one template from among the N-pieces of templates 412. The target data communication unit 46 sends the POST command 414-1 to the service providing server 100, thereby receiving image data 416-1 from the service providing server 100. Consequently, the control unit 30 causes an image represented by the image data 416-1 to be printed by the print performing unit 18.

Next, the creation unit 44 creates a POST command 414-2 by using another template from among the N-pieces of templates 412. The target data communication unit 46 sends the POST command 414-2 to the service providing server 100, thereby receiving image data 416-2 from the service providing server 100. Consequently, the control unit 30 causes an image represented by the image data 416-2 to be printed by the print performing unit 18. This process is repeated N times.

That is, the multi-function device 10 downloads N-pieces of image data from the service providing server 100, and prints N-pieces of images.

The processes executed by the devices 10, 50, 100 from the communication of a URL request (e.g., the URL request 408) from the multi-function device 10 to the intermediation server 50 until the printing of N-pieces of images is called "one set of processes". Upon ending a first set of processes, the obtaining unit 42 of the multi-function device 10 selects another N-pieces of image IDs that are a part of the M1-pieces of image IDs included in the list 406 (i.e., N-pieces of image IDs that are different from the N-pieces of image IDs selected in the first set) and sends, to the intermediation server 50, a URL request that includes the N-pieces of image IDs. Thereby, a second set of processes is executed. As described above, in the present embodiment, M2-pieces of image IDs are selected simultaneously by the specific user. The URL request from the multi-function device 10 to the intermediation server 50 (e.g., the URL request 408) includes N-pieces of image IDs. Consequently, in the example of FIG. 5, M1/N sets of processes are executed in total.

Figure 5:
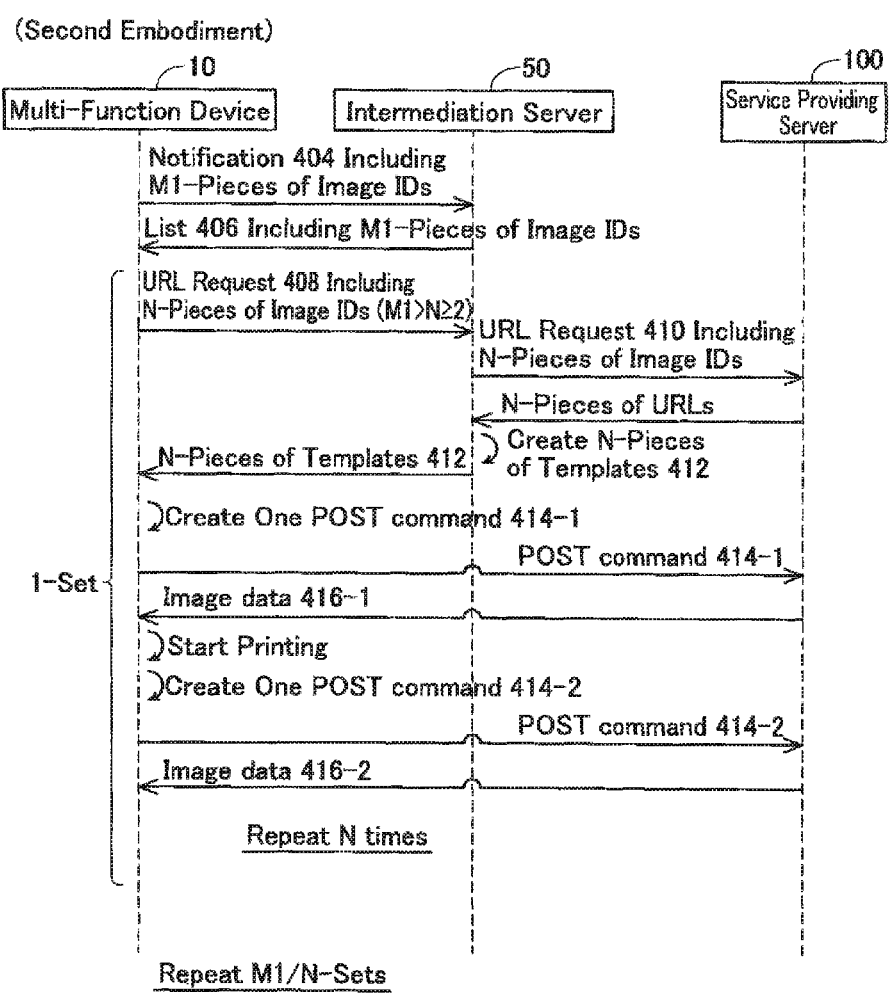
FIG. 5 shows a sequence diagram of processes executed by devices of a second embodiment when download print is executed.

Moreover, processes for the multi-function device 10 to execute the scan UL function are executed in the same manner as in the example of FIG. 5. For example, in case M2-pieces of image data are created simultaneously by the multi-function device 10 executing a scan, the multi-function device 10 selects N-pieces of image IDs, which are a part of the M2-pieces of image IDs, and sends a URL request that includes the N-pieces of image IDs to the intermediation server 50. Consequently, in a first set of processes, the multi-function device 10 can upload N-pieces of image data to the service providing server 100. Then, the multi-function device 10 selects subsequent N-pieces of image IDs, which are a part of the M2-pieces of image IDs, and sends a URL request that includes the N-pieces of image IDs to the intermediation server 50. Consequently, in a second set of processes, the multi-function device 10 can upload N-pieces of image data to the service providing server 100.

(Effect of the Present Embodiment)

In the present embodiment, as shown in FIG. 5, in the first set of processes, the multi-function device 10 creates the N-pieces of POST commands 414-1, 414-2 by using the N-pieces of templates 412 and sends the N-pieces of POST commands 414-1, 414-2 to the service providing server 100. Then, subsequently, in the second set of processes, the intermediation server 50 prepares the next N-pieces of templates. Consequently, it is possible to prevent there being a large time difference between the timing at which the template is prepared in the second set of processes and the timing of sending the POST command which was created by using that template. Consequently, it is possible to prevent the service providing server 100 from determining that the time stamp is invalid. As a result, the multi-function device 10 and the service providing server 100 can appropriately execute the communication (downloading or uploading) of a plurality of image data.

(Corresponding Relationships)

The N-pieces of image IDs included in the URL request 408 sent in the first set of processes (called "URL request of the first set" below) are an example of the "N1-pieces of identification information". The N-pieces of image IDs included in the URL request sent in the second set of processes (called "URL request of the second set" below) are an example of the "N2-pieces of identification information". Moreover, in the above embodiment, the number (N-pieces) of image IDs included in the URL request of the first set and the number (N-pieces) of image IDs included in the URL request of the second set are identical. However, in a variant, the number of former image IDs and the number of latter image IDs may differ.

Further, the URL request of the first set and the URL request of the second set are respectively examples of the "first request" and the "second request". Further, one image ID from among the N-pieces of image IDs included in the URL request of the first set, and one image ID from among the N-pieces of image IDs included in the URL request of the second set are respectively examples of the "first identification information" and the "second identification information".

(Variant 1)

The "communication device" is not limited to the multi-function device 10, but may be another type of communication device (e.g., PC, server, PDA, mobile terminal, printer, scanner, telephone, FAX device, copier, etc.). Further, the "specific server" is not limited to the service providing server 100 that provides cloud service, but may be another type of server that performs communication of data with the "communication device" (e.g., a server that executes image processing on image data). Further, the "target data" is not limited to the image data, but may be another type of data (e.g., may be data created by word processing software, or data created by spreadsheet software).

(Variant 2)

In the above embodiments, as shown for example in FIG. 2, the preparation unit 72 of the intermediation server 50 prepares the template 232 under the condition that the communication of the image data 216 between the multi-function device 10 and the service providing server 100 has been completed by the multi-function device 10 sending the POST command 214 to the service providing server 100. Instead, the preparation unit 72 may prepare the template 232 after the multi-function device 10 has sent the POST command 214 to the service providing server 100 and before the communication of the image data 216 ends. In order to realize the present variant, for example, the obtaining unit 42 of the multi-function device 10 may send the URL request 228 to the multi-function device 10 while the image data 216 is being downloaded from the service providing server 100. Generally speaking, the preparation unit 72 of the intermediation server 50 may prepare the second demand-creation data under the condition that the communication device has sent the first communication demand to the specific server. Further, the obtaining unit 42 of the multi-function device 10 may obtain the second demand-creation data from the intermediation server under the condition that the first communication demand has been sent to the specific server.

(Variant 3)

In the above embodiments, the preparation unit 72 of the intermediation server 50 prepares the template (e.g., the template 212 of FIG. 2) necessary for the multi-function device 10 to create the POST command. However, the preparation unit 72 may prepare a template necessary for the multi-function device 10 to create another type of command (e.g., a GET command). Generally speaking, the preparation unit 72 of the intermediation server 50 may prepare demand-creation data that includes timing information. Further, the creation unit 44 of the multi-function device 10 may create the communication demand by using the demand-creation data.

(Variant 4)

In the above embodiments, the template includes the time stamp that shows the date and time the template was prepared. Instead, the template may include a time stamp that shows only the date the template was prepared, or may include a time stamp that shows only the time the template was prepared.

Further, the template may include a time stamp that shows a date and time to which a predetermined time has been added to the date and time of preparing the template (i.e., a date and time indicating the period of validity of the template). Moreover, the "timing information" is not limited to information having the appellation "time stamp", but may be information having another appellation. Generally speaking, the "timing information" may be any information related to the timing at which the demand-creation data was prepared.

(Variant 5)

In the second embodiment, the preparation unit 72 of the intermediation server 50 prepares the N-pieces of templates 412. Instead, the preparation unit 72 of the intermediation server 50 may create one template and N-pieces of information which are to be described in the template (the N-pieces of information here include, for example, N-pieces of URLs and one time stamp). In this case, the creation unit 44 of the multi-function device 10 may describe one information from among the N-pieces of information in the one template, thereby creating the POST command 414-1, and may describe another information from among the N-pieces of information into the one template, thereby creating the POST command 414-2. In the present variant, the N-pieces of information are an example of the "demand-creation data".

(Variant 6)

In the above embodiments, the functions of the units 40 to 46, 70 to 74 are realized by the CPUs 32, 62 of the multi-function device 10 and the intermediation server 50 executing processes according to software. Instead, at least a part of the functions of the units 40 to 46, 70 to 74 may be realized by hardware such as a logic circuit, etc.

The invention claimed is:

1. An intermediation server configured to intermediate a communication between a communication device and a specific server, the intermediation server comprising:
   a processor; and
   a memory storing computer-readable instructions therein, the computer-readable instructions, when executed by the processor, causing the intermediation server to perform:
   receiving one notification from the communication device, the one notification including a plurality of identification information for identifying a plurality of target data to be communicated between the communication device and the specific server;
   preparing a plurality of demand-creation data corresponding to the plurality of target data by using the plurality of identification information included in the one notification in a case where the one notification is received from the communication device, each of the plurality of demand-creation data being data which is necessary for the communication device to create one communication demand for communicating one target data corresponding to the demand-creation data, and each of the plurality of demand-creation data including timing information related to a timing at which the demand-creation data has been prepared; and
   supplying the plurality of demand-creation data to the communication device;
   wherein the preparing the plurality of demand-creation data includes:
   preparing first demand-creation data corresponding to first target data among the plurality of target data; and
   preparing second demand-creation data corresponding to second target data among the plurality of target data after preparing the first demand-creation data, under a condition that the communication device has created a first communication demand by using the first demand-creation data and has sent the first communication demand to the specific server.

2. The intermediation server as in claim 1, wherein
the preparing the second demand-creation data is performed under a condition that a communication of the first target data has been completed between the communication device and the specific server after the communication device has sent the first communication demand to the specific server.

3. The intermediation server as in claim 1, wherein
the preparing the plurality of demand-creation data further includes:
sending a list to the communication device in the case where the one notification is received from the communication device, the list including the plurality of identification information included in the one notification,
the preparing the first demand-creation data is performed in a case where a first request including first identification information for identifying the first target data is received from the communication device, the first identification information being selected by the communication device from among the plurality of identification information included in the list, and
the preparing the second demand-creation data is performed in a case where a second request including second identification information for identifying the second target data is received from the communication device, the second identification information being selected by the communication device from among the plurality of identification information included in the list, the second request being a request received from the communication device after the communication device has sent the first communication demand to the specific server.

4. The intermediation server as in claim 3, wherein
the preparing the plurality of demand-creation data further includes;
in the case where the first request is received from the communication device, obtaining from the specific server first location information indicating a first location within the specific server by using the first identification information included in the first request, so as to prepare the first demand-creation data by using the first location information; and
in the case where the second request is received from the communication device, obtaining from the specific server second location information indicating a second location within the specific server by using the second identification information included in the second request, so as to prepare the second demand-creation data by using the second location information.

5. The intermediation server as in claim 3, wherein
the first request includes only the first identification information among the plurality of identification information, and
the second request includes only the second identification information among the plurality of identification information.

6. The intermediation server as in claim 3, wherein
the first request includes N1-pieces of identification information among the plurality of identification information, the N1-pieces of identification information including the first identification information, the N1-pieces of identification information being a part of the plurality of identification information, and the N1 being an integer equal to 2 or more, and the second request includes N2-pieces of identification information among the plurality of identification information, the N2-pieces of identification information including the second identification information, the N2-pieces of identification information being a part of the plurality of identification information, and the N2 being an integer equal to 2 or more.

7. The intermediation server as in claim 1, wherein each of the plurality of demand-creation data is data which is necessary for the communication device to create one communication demand of a POST command.

8. The intermediation server as in claim 1, wherein each of the plurality of target data is data to be downloaded from the specific server to the communication device.

9. The intermediation server as in claim 1, wherein each of the plurality of target data is data to be uploaded from the communication device to the specific server.

10. A communication device configured to communicate with a specific server via an intermediation server, the communication device comprising:
  a processor; and
  a memory storing computer-readable instructions therein, the computer-readable instructions, when executed by the processor, causing the communication device to perform:
    sending one notification to the intermediation server, the one notification including a plurality of identification information for identifying a plurality of target data to be communicated between the communication device and the specific server, the intermediation server being a server configured to prepare a plurality of demand-creation data corresponding to the plurality of target data by using the plurality of identification information included in the one notification in a case where the one notification is received from the communication device, each of the plurality of demand-creation data being data which is necessary for the communication device to create one communication demand for communicating one target data corresponding to the demand-creation data, and each of the plurality of demand-creation data including timing information related to a timing at which the demand-creation data has been prepared;
    obtaining the plurality of demand-creation data from the intermediation server;
    creating a plurality of communication demands by using the plurality of demand-creation data; and
    sending the plurality of communication demands to the specific server so as to communicate the plurality of target data with the specific server,
  wherein the obtaining the plurality of demand-creation data includes:
    obtaining first demand-creation data corresponding to first target data among the plurality of target data; and
    obtaining second demand-creation data corresponding to second target data among the plurality of target data after obtaining the first demand-creation data, under a condition that the communication device has created a first communication demand by using the first demand-creation data and has sent the first communication demand to the specific server.

11. A non-transitory computer-readable medium for an intermediation server configured to intermediate a communication between a communication device and a specific server, the non-transitory computer-readable medium storing computer-readable instructions, when executed by a processor of the intermediation server, causing the intermediation server to perform:
  receiving one notification from the communication device, the one notification including a plurality of identification information for identifying a plurality of target data to be communicated between the communication device and the specific server;
  preparing a plurality of demand-creation data corresponding to the plurality of target data by using the plurality of identification information included in the one notification in a case where the one notification is received from the communication device, each of the plurality of demand-creation data being data which is necessary for the communication device to create one communication demand for communicating one target data corresponding to the demand-creation data, and each of the plurality of demand-creation data including timing information related to a timing at which the demand-creation data has been prepared; and
  supplying the plurality of demand-creation data to the communication device;
  wherein the preparing the plurality of demand-creation data includes:
    preparing first demand-creation data corresponding to first target data among the plurality of target data; and
    preparing second demand-creation data corresponding to second target data among the plurality of target data after preparing the first demand-creation data, under a condition that the communication device has created a first communication demand by using the first demand-creation data and has sent the first communication demand to the specific server.

* * * * *